US008245611B2

(12) United States Patent
Möckli et al.

(10) Patent No.: US 8,245,611 B2
(45) Date of Patent: Aug. 21, 2012

(54) METHOD AND DEVICE FOR TRANSPORTING FLEXIBLE, TWO-DIMENSIONAL PRODUCTS AND SIMULTANEOUSLY CUTTING THESE

(75) Inventors: Heinz Möckli, Grütt (CH); Erwin Müller, Dürnten (CH)

(73) Assignee: Ferag AG, Hinwill (CH)

( * ) Notice: Subject to any disclaimer, the term of this patent is extended or adjusted under 35 U.S.C. 154(b) by 154 days.

(21) Appl. No.: 11/337,116

(22) Filed: Jan. 23, 2006

(65) Prior Publication Data

US 2006/0179988 A1 Aug. 17, 2006

(30) Foreign Application Priority Data

Jan. 21, 2005 (CH) .................................. 2005-0120

(51) Int. Cl.

| | |
|---|---|
| ***B26D 1/00*** | (2006.01) |
| ***B26D 1/44*** | (2006.01) |
| ***B26D 7/20*** | (2006.01) |
| ***B26D 7/06*** | (2006.01) |
| ***B23D 35/00*** | (2006.01) |
| ***B42B 2/00*** | (2006.01) |
| ***B65H 39/00*** | (2006.01) |
| ***B65H 29/10*** | (2006.01) |

(52) U.S. Cl. ............... 83/13; 83/423; 83/404.3; 83/409; 83/674; 270/52.18; 271/85

(58) Field of Classification Search ........... 83/13, 404.4, 83/408.1, 404.3, 409, 423, 674, 673; 270/52.18, 270/52.3, 53.54; 101/485, 408; 271/204, 271/85, 277

See application file for complete search history.

(56) References Cited

U.S. PATENT DOCUMENTS

| | | | | |
|---|---|---|---|---|
| 2,798,291 | A | 7/1957 | Smith | |
| 3,846,910 | A | 11/1974 | Davis | |
| 5,110,108 | A * | 5/1992 | Muller | 271/69 |
| 5,113,731 | A * | 5/1992 | Reist | 83/35 |
| 5,169,139 | A * | 12/1992 | Stauber et al. | 271/204 |
| 5,551,682 | A * | 9/1996 | Luthi | 83/37 |
| 5,715,737 | A * | 2/1998 | Stauber et al. | 83/154 |
| 5,809,856 | A * | 9/1998 | Reist et al. | 83/34 |
| 5,832,799 | A * | 11/1998 | Luthi et al. | 83/423 |
| 5,950,511 | A * | 9/1999 | Luthi | 83/37 |

(Continued)

FOREIGN PATENT DOCUMENTS

CH 668216 12/1988

(Continued)

OTHER PUBLICATIONS

European Search Report for European Patent Application No. 06 00 1095, issued on May 18, 2006.

*Primary Examiner* — Ghassem Alie
*Assistant Examiner* — Bharat C Patel
(74) *Attorney, Agent, or Firm* — Robert E. Bushnell, Esq.

(57) ABSTRACT

A method for transporting two-dimensional, flexible products, in particular printed products, such as newspapers and magazines or parts thereof, with which the product is conveyed from one gripper of a conveyor device, freely held along a conveyor path at least in regions, and the product grasped by the gripper at the edge which is not to be cut, on the conveyor path, is brought into active connection with cutting means of a cutting station in a manner such that at least one edge of the product is cut.

14 Claims, 10 Drawing Sheets

U.S. PATENT DOCUMENTS

| | | | | | |
|---|---|---|---|---|---|
| 5,957,449 | A * | 9/1999 | Luthi | ............................ | 271/204 |
| 6,003,859 | A * | 12/1999 | Reist | ............................ | 271/204 |
| 6,270,076 | B1 * | 8/2001 | Reist | ............................ | 271/302 |
| 6,394,449 | B1 * | 5/2002 | Reist | ............................ | 271/204 |
| 6,698,742 | B2 * | 3/2004 | Hansch | ...................... | 270/52.22 |
| 7,591,223 | B2 * | 9/2009 | Mockli | ......................... | 101/485 |
| 2002/0125630 | A1 * | 9/2002 | Muller et al. | ................. | 271/204 |
| 2004/0089991 | A1 * | 5/2004 | Stauber | ........................ | 270/52.3 |
| 2005/0236757 | A1 * | 10/2005 | Mockli | ...................... | 270/52.14 |

FOREIGN PATENT DOCUMENTS

| | | |
|---|---|---|
| CH | 685153 | 4/1995 |
| CH | 690296 | 7/2000 |
| CN | CH 668216 | 12/1988 |
| CN | CH 685153 | 4/1995 |
| CN | CH 690296 | 7/2000 |
| DE | 19638307 | 4/1997 |
| DE | 10052010 | 5/2001 |
| DK | DE 19638307 | 4/1997 |
| DK | DE 10052010 | 5/2001 |
| EP | 0367715 | 5/1990 |
| EP | 0762950 | 3/1997 |
| EP | 0854105 | 7/1998 |
| EP | 1411011 | 4/2004 |
| WO | WO 0181217 | 11/2001 |

* cited by examiner

METHOD AND DEVICE FOR TRANSPORTING FLEXIBLE, TWO-DIMENSIONAL PRODUCTS AND SIMULTANEOUSLY CUTTING THESE

CLAIM OF PRIORITY

This application makes reference to, incorporates the same herein, and claims all benefits accruing under 35 U.S.C. §119 from an application for METHOD AND DEVICE FOR THE TRANSPORT OF FLEXIBLE AND THREE-DIMENSIONAL PRODUCTS AND SIMULTANEOUS CUTTING THEREOF earlier filed in the Swiss Federal Institute of Intellectual Property on 21 Jan. 2005 and there duly assigned Ser. No. 00120/05.

BACKGROUND OF THE INVENTION

1. Field of the Invention

The present invention relates to a method and to a device for the transport and simultaneous cutting of flexible, two-dimensional products, in particular of printed products such as newspapers, magazines or parts thereof.

2. Description of the Related Art

Printed products during their manufacture run through various working stations, wherein the transport of the printed products within the working stations is configured differently, according to the different requirements. Thus the transport may be effected within one working station, e.g. in an insert drum with pockets or in a revolving pocket transport system, but also in a collector drum or in a collector transport system with saddles. The printed products as a rule are conveyed from one working station to the next working station by way of conveyor devices. Hereby, they are typically held individually by individual grippers, mostly at the open end or the fold, and transported in a hanging manner. For cutting the edges too, the printed products today must be transferred into special transport units according to the applied cutting methods, such as into a pocket transport system, for example as this is described in CH 668216, or in rotating cell wheels, as this is described e.g. in CH 685153 or in EP0367715. The transfer of the printed products from the grippers of the X conveyor device to the transport unit of the working station and back again to a conveyor device demands a certain coordination effort with the incoming transport as well as outgoing transport of the printed products.

A method and a device are described in EP 0762950, with which this coordination effort is to be reduced in that the grippers remain allocated to the printed products during the cutting process, so that the printed products are led to the cutting station and again led away from this in each case by the same grippers. The printed products are transferred to clamping clips for the cutting process itself. The grippers are opened for aligning the printed products, and the printed products are firstly displaceably deposited in the clamping clips perpendicular to the conveying direction. After alignment, the printed products are clamped in the clamping clips and are stabilized by these for cutting.

A method and a device are also described in DE 10052010, with which the coordination effort is low, since no transfer to a separate transport unit is effected for the cutting. The printed products in transport pockets are led up to a cutting station, remain in their pockets during the cutting, and are also transported away again from the cutting station in the pockets. With this, the products are transported in the pockets in a standing manner, wherein the pocket walls laterally stabilize the products over a large surface and support them against gravity.

Since very many transport means such as grippers or pockets are required for the transport of the products, the design of the transport means is a cost factor which may not be neglected. Hereby, the complexity of the mechanics play just an important role as the material costs. However, the number of required transport means should also be kept as low as possible. Both solutions for transport and cutting two-dimensional, flexible products known from the state of the art do not provide any satisfactory solution here.

SUMMARY OF THE INVENTION

It is the object of the present invention to provide a method and a device which in contrast to these known methods and associated devices, permit a simple and inexpensive transport and cutting of two-dimensional, flexible products.

This object is achieved by a method according to claim 1 and a device according to claim 12.

With the method according to the invention or with the device according to the invention, the two-dimensional, flexible products such as printed products for example, are grasped by the gripper of a conveyor device at its edge which is not to be cut, on the conveyor path, wherein the products at least in regions are conveyed in a freely hanging manner. The products in this manner are led past a cutting station arranged in the conveyor path of the conveyor device, and with this are brought into active connection with the cutting means of the cutting station in a manner such that at least one edge of the product is cut.

If with regard to the product, it is the case of a folded printed product, then the printed product is conveyed along the conveying path preferably grasped at the fold.

A support or stabilization of the products for the cutting is not necessary, since the products on cutting are held in the necessary manner at least by parts of the cutting means cutting them. For this reason, neither the conveyor device nor the cutting station have means for stabilizing the products. Thus the present invention has the great advantage that conventional gripper transporters or other clips which grasp the printed product in the region of the fold only in a gentle manner, are able to be applied. Complex, multiple transfers of the printed product, with a corresponding proneness to breakdown and which relate to the cutting procedure may therefore be done away with.

Very different cutting methods and accordingly many different cutting devices for cutting the side edges and a free edge lying opposite the gripper may be applied with the specified device or method. Thus the cut may for example be effected with a knife against a cutting bar, with a cutting roller or with a stationary knife against a counter-bearing or counter-knife with the shear cutting method, but also knives and counter-knives moved relative to one another with the shear cutting method or impulse cutting method may be operated.

The leading-together of the products with at least one part of the cutting means of the cutting station in an active region may also be effected in very different manners. Thus e.g. it is possible for at least one part of the cutting means to penetrate the product flow, or for the products and at least one part of the cutting means to mesh with one another, or at least one part of the cutting means to be led together with the products by way of lateral introduction, or at least one part of the cutting means to be brought into supportive contact with the edges to be cut.

If more than one edge is cut, the cutting of the side edges and the cutting of the free edge lying opposite the gripper is preferably effected after one another with respect to time, in order to ensure an improved quality of cut. With this, the sequence in which the side edges and the free edge are cut is variable. The side edges may also be simultaneously cut.

The cutting station preferably comprises cutting means which for example comprise a knife and a cutting bar which are connected to one another via an axis, and specifically in a manner such that with a pivoting of the knife and cutting bar counter to one another, the knife operates against the cutting bar in the manner of a knife cut. But the cut-ting means may just as well comprise such a connection of a knife and a counter-knife via a pivot axis. The knife and counter-knife then operate against one another on pivoting, in the manner of a shear cutting method.

In a preferred embodiment, the cutting station comprises cutting means which penetrate the product flow. For penetrating the product flow, it is most simple to provided cutting means which are movable on an endless circulation from an idle position on a first movement path into a working position on a second movement path, wherein they are brought between the two-dimensional, flexible products by way of this movement. This embodiment of the method or the device is very simple to realize if the cutting means are movable from the first movement path onto the second movement path in a hydraulic, pneumatic or mechanical manner, and the control for this is effected electronically or with the help of motion links.

In a further preferred embodiment, the penetrating cut-ting means for cutting with the shear cutting method comprise circular-disk-shaped knives which operate counter to one another, or a circular-disk-shaped knife which operates counter to a cutting bar. The circular-disk-shaped knives, or circular-disk-shaped knife and the cutting bar are movably mounted in guide elements, in a manner such that they cut the printed product whilst the cutting means are introduced into the product flow in a penetrating manner or removed from this again. In a particularly preferred manner, this is then possible if the circular-disk-shaped knives, or the circular-disk-shaped knife and the cutting bar are movably mounted in a manner such that they execute an analogous movement superimposing on the penetration move-ment, and at the same time may cut the side edges of the products. The cutting movement of the circular-disk-shaped knives is effected preferably from the edge of the product which is not to be cut, in the direction of the free edge lying opposite the gripper, thus with a folded printed product from the fold in the direction of the so-called open end. It is particularly advantageous in each case to allocate a pressing roller which leads during the cutting, to both circular-disk-shaped knives or to the one circular-disk-shaped knife and where appropriate, also to the cutting bar. Thus the products in the region running ahead of the cut are clamped and tautened by the pressing rollers, which permits a particularly clean cut.

In a particularly preferred embodiment, the device for the cutting procedure comprises an impulse cutting device in one or more of the cutting units. By way of the impulse cutting method which may be carried out with this device, one may do away with having to bring a knife or counter-knife to bear on the two-dimensional, flexible product to be cut. This is because one does not actually operate against a knife or a counter-knife, but (comparatively) heavy knives and counter-knives are applied, which on ac-count of their mass and speed entail a corresponding im-pulse. On account of the speed with which these knives are moved relative to one another, a product to be cut and which is brought between the knives, is cut off along the edge to be cut by way of the introduced impulse.

For the cutting of the side edges of a product conveyed on an approximately circular path by way of a cutting unit provided with an impulse cutting device, it is particularly advantageous when the impulse cutting device is provided with a cage which rotates about a rotation axis and is designed in the shape of a truncated cone. Knives which revolve in opposite directions or accordingly quicker or slower in the same direction are provided within the rotating cage on a corresponding, somewhat smaller conical periphery. The cage comprises openings whose edges cooperate with the revolving knives for cutting the products. The angle of inclination of the conical surface with respect to the rotation axis is preferably selected such that the speed difference from the radial outer edge to the inner radial edge of the product conveyed on the approximately circular path by the cutting unit is compensated. For the cutting of the edge lying opposite the gripper, the impulse cutting devices may in contrast be constructed in a relatively simple manner, and the cage may have the shape of a cylinder periphery, wherein the knives rotating within the cylinder periphery are correspondingly arranged on a cylinder periphery with a somewhat smaller radius. Instead of a cage with edges, counter-knives or other hacking or cutting means are conceivable which revolve on a corresponding peripheral surface.

If the grippers may be conveyed in the conveyor means pivotally by 90° and/or variably in their distance to one another, then this increases the flexibility of the device according to the invention. They may then comprise further, differently designed cutting means and by way of the possible braking and acceleration of the grippers on the conveyor path, may be combined more simply with slower or quicker working stations.

Further designs of the device according to the invention or of the method according to the invention are described in further independent claims.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

The same objects are in principle provided with the same reference numerals.

DETAILED DESCRIPTION OF THE INVENTION

Figure 1:
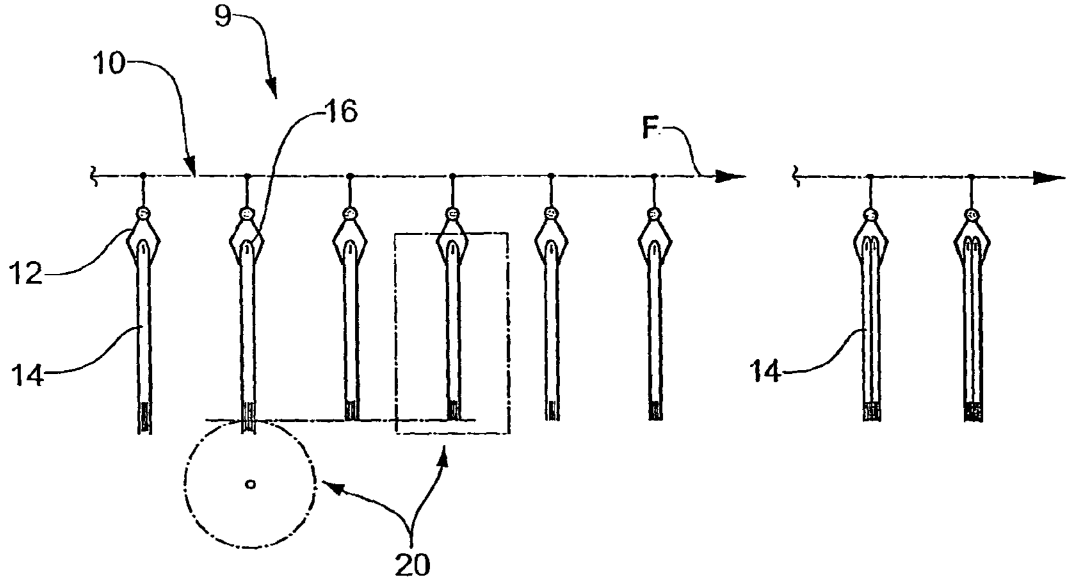
FIGS. 1 through 3 illustrate basic possibilities of the device according to the invention and of the method according to the invention.
Figure 2:
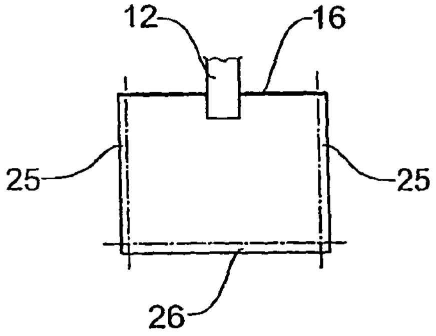
Figure 3:
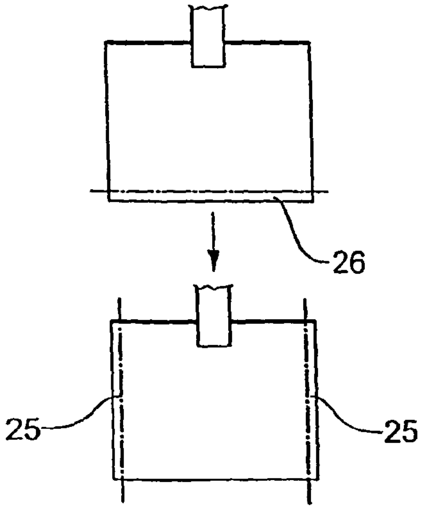

FIGS. 1 to 3 schematically show the principle of the present invention. In a device 9 according to the invention with a conveyor device 10 with grippers 12, products 14 at an edge 16 which is not to be cut in this example printed products 14 at their respective fold 16 are grasped, and for cutting are transported past a cutting station 20 in the conveyor direction F. The printed products 14 with this, at least in regions on the conveyor path, hang in the grippers 12 following gravity and thereby as a rule extend in their longitudinal direction transversely to the conveyor direction F. In this context, a product 14 is to be under-stood as an individual flexible, two-dimensional product which however e.g. may he folded once or several times, but also, as commonly occurs with printed products, may be envelope (cover) sheets with further printed products which are collected or inserted therein. Furthermore, also two or more such individual folded or non-folded products which are arranged next to one another in a gripper 12 also fall under the collective and main term of the product 14 used here. Also two or more envelopes with collected or inserted products and arranged in a gripper, as are shown in FIG. 1 to the very right, also fall under the term product 14.

So that the side edges 25 and the free edge 26 lying opposite the gripper 12 may be cut in an as exact as possible manner, in this example, the products 14 have been aligned in the known manner (not shown) already before reaching the cutting station 20. For this, the products 14 for example have already been aligned on grasping by the grippers 12 of the conveyor device 12, as this is described in EP 1411011 for example, or they are aligned in an aligning station, as is disclosed in EP 0518064. It is likewise conceivable, for the positioning of the products 14 for achieving an as precise as possible cut, to design the grippers 12 of the conveyor device 10 in a displaceable manner, as this is shown in WO 01/81217.

With the printed products 14 represented here, the side edges 25 are often indicated as the head or foot, the free edge 26 as the open end or front, and the edge 16 which is not to be cut and in whose region the gripper 12 grips the product 14, as the fold.

The products 14 at the edge 16 which is not to be cut (at the fold) are conveyed in a grasped manner. This means that that for conveying, they are held by one or more grippers 12 (here in each case only one gripper 12 is represented) from the side of the edge 16 which is not to be cut (fold-side), or at the edge 16 itself which is not to be cut itself (at the fold itself), or also only in the region of the edge 16 which is not to be cut (in the region of the fold). The products 14 which are conveyed in this manner in a freely held condition, according to the invention, are cut in a freely held manner, which means to say they are cut without already being held ready by separate elements for the engagement of the cutting means 28. Products 14 conveyed in a freely held manner or in the freely held condition are to be understood as products 14 which are conveyed in a freely hanging manner following gravity, when the edge 16 which is not to be cut is grasped by the gripper 12 is located above.

As is shown in the FIGS. 2 and 3, it is conceivable to cut the edges 25, 26 of the products 14 freely held in the gripper 12 in a different temporal succession. It is thus possible for example with a suitable device, to simultaneously cut all edges 25, 26 as is shown in FIG. 2. Or however, as is shown in FIG. 3, firstly the free edge 26 lying opposite the gripper 12 and then the two side edges 25 are cut, wherein the side edges 25 may be simultaneously cut, as is shown in FIG. 3 or however also sequentially after one another (not shown). It is to be understood that the sequence of the cut may also be interchanged. Thus the side edges 25 may be cut simultaneously or sequentially before the free edge 26, or the cutting of the edge 26 may be effected between the cutting of the side edges 25.

Hereinafter, specific methods and devices are presented, with which these principles of the transport and cutting according to the invention may be realized.

Figure 4:
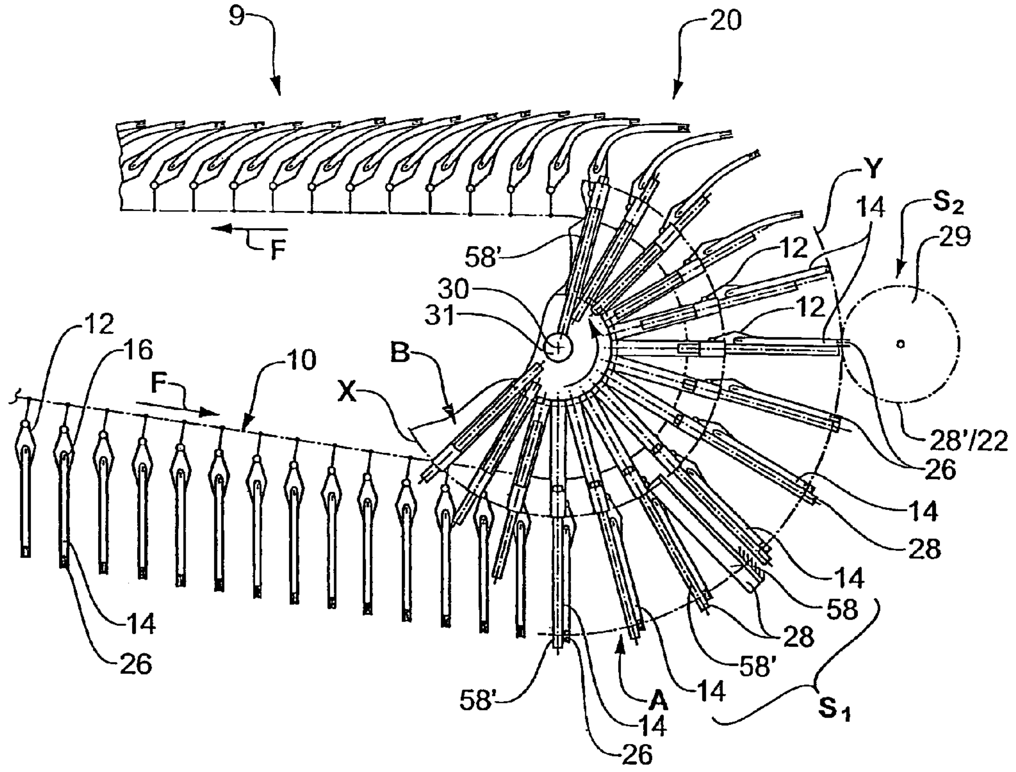
FIGS. 4 through 7 illustrate a first embodiment of the device according to the invention.

In the device 9 according to the invention which is represented in the FIGS. 4 to 7, products 14 again by way of example printed products 14 which are grasped at their fold 16 by grippers 12 are conveyed in a conveyor device 0 along a conveyor path in the direction F. The device 9 according to the invention, here comprises a cutting station 20 which is arranged in the conveyor path and around which the products 14 freely held in the grippers 12 are led on a segment of an approximately circular path. In order to be able to cleanly cut the side edges 25 of the products 14, the cutting station 20 comprises cutting means 28 which in this example on both sides of the conveyor path comprise a stationary knife 58 and a counter-knives 58' arranged around the rotation arbor 30. The rotation arbor 30 lies roughly concentrically to the axis about which the products 14 in the grippers 12 are led, and extends roughly perpendicular to the conveyor direction F and roughly parallel to the products 14 aligned in the grippers 24. The counter-knives 58' project radially outwards from the rotation arbor 30, are arranged around the rotation arbor 30 at regular distances, and are connected to a shaft 31 which rotates about the rotation arbor 30 in a rotational fixed manner. In each case, two counter-knives 58' are arranged distanced and parallel to one another on the shaft 31, wherein the distance of the counter-knives 58' to one another may be set in a variable manner, so that this distance may be adapted to the format of the product 14 to be cut. The position of the two stationary knives 58 may likewise be changed, such that the knives 58, adapted to the format of the product 14 to be cut, come into cutting interaction with the respective counter-knives 58', and cut the side edges 25 of the products 14. The counter-knives 58' for the cutting, before cooperation with the knives 58, are brought to bear with the products 14 conveyed in the grippers 12. The cutting of the side edges 25 (head/foot cut) is indicated in FIG. 4 in the region S1 and is shown in FIG. 6 in a front view of the product 14.

In order to bring the counter-knives 58' between the products 14 which are grasped by the grippers at the edges 16 which are not to be cut, these may be moved out of an idle position B on a first movement path x in the region close to the axis roughly radially outwards, into a working position A remote from the axis on a second movement path y. This movement may be ensured by a suitable movement unit 18, e.g. via suitable hydraulics, pneumatics or mechanics ( also FIGS. 5 to 8). By way of this movement radially outwards superimposed on the rotation movement of the counter-knives 58', the counter-knives 58' may penetrate the product flow, i.e. they may penetrate between the products 14 which are freely held in the grippers 12. The rotation speed about the rotation arbor 30, the distance of the counter-knives 58' to one another, the movement from the first movement path x onto the second movement path y, as well as the distance and the transport speed of the grippers 12 of the conveyor device 10 are suitably matched (coordinated) to one another. In the example shown here, the counter-knives 58' are introduced between the products 14 from the side of the grippers 12, as this is represented in the FIGS. 4 to 6.

A further cutting means 28' is arranged downstream of the region S1 in a region S2, which serves for cutting the free edge 26 of the product 14 which lies opposite the gripper 12. This cutting means 28' within the cutting station 20 is also called the first cutting unit 22 for cutting the free edge 26 (front or open end cut). The cutting means 28' in the example shown here is designed as a type of cutting roller 29 with an integrated counter-knife, as is also described in more detail by way of example and by way of FIG. 13. The cutting means 28' for cutting the edge 26 may however also be designed in a suitably different manner.

Figure 5:
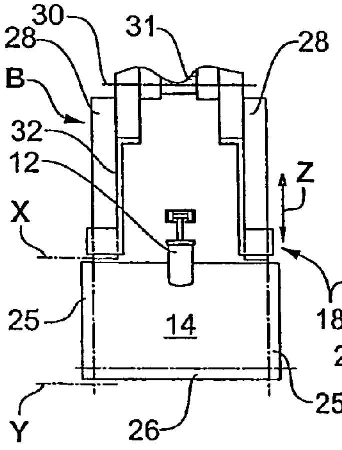
Figure 6:
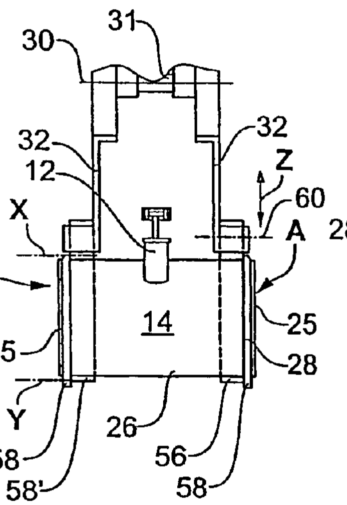
Figure 7:
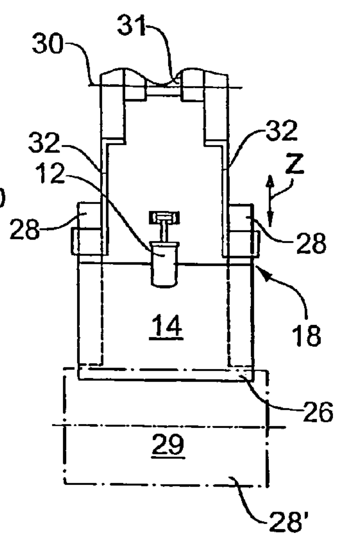

Method steps which take their course with this device 9 according to the invention are shown in the FIGS. 5 to 7 for clarification in a front elevation of the product 14. FIG. 5 shows the product 14 to be cut at the edges 25, 26, freely held and transported in the gripper 12, as it is transported into the cutting station 20 arranged in the conveyor path. In the region of the side edges 25, counter-knives 58' from the side of the gripper 12 are introduced between the shown product 14 and a product running after it (not shown here). With this, the counter-knives 58' are moved (arrow Z) from an idle position B close to the axis on the first movement path x (indicated with a dashed line), FIG. 6, into a working position A which is remote from the axis, FIG. 7, on the second movement path y (likewise indicated with a dashed line). In the example shown here, the counter-knives 58' are displaced in a hydraulic manner in guide units 32, wherein the guide units 32 are connected to the shaft 31 in a rotationally fixed manner. Shown in FIG. 6 on the left side, a counter-knife 58' in the working position A is located on the second movement path y and comes into cutting engagement with the stationary knife 58, so that the side edge 25 is cut. It is shown in FIG. 7 how the counter-knives 58' are moved back from the working position A on the second movement path y into the idle position B on the first movement path x (arrow Z), and simultaneously how the product 14 is led past the cutting roller 29 in the region S2, wherein the free edge 26 of the product 14 is cut.

Instead of the stationary knife 58 and the counter-knives 58', the cutting means 28 may also be designed as a knife 58 and cutting bar 56 which are actively connected to one another via a pivot arbor 60 (indicated by a dashed line). This is indicated in FIG. 6 on the right side, where a knife 58 is connected to a cutting bar 56 via a pivot arbor 60. The cutting of the knife 58 against the cutting bar 56 is shown in the represented method step. The cutting means 28 as a further embodiment may be designed as this is shown in FIG. 9 and in FIG. 8, on the right side of the cutting station 20 of the device 9. The cutting means 28 instead of a pivotable knife 58 and a cutting bar 56 or a counter-knife 58', comprise a circular-disk-shaped knife 48 which operates counter to a cutting bar 54. The cutting bar 54 and the circular-disk-shaped knife 48 are movably guided in a guide element 53. As may be recognized from FIG. 9, with the example shown here, with regard to the guide element 53 it is the case of a U-shaped profile which in its side regions comprise guide rails 50 for guiding guide slides 52 movable thereon. However other guide means may also be applied instead of the guide rails 50 and the guide slides 52, such as running rollers and grooves and likewise.

The cutting bar 54 or the circular-disk-shaped knife 48 are mounted in the guide elements 53 in a movable manner via the guide slides 52 such that in a superimposed, analogous movement to the penetration movement of the guide elements 53—they may be moved from the idle position B into the working position A from a position proximal to the axis into a position distant to the axis, and with this cut the side edges 25 of the printed products 14. For this, the circular-disk-shaped knife 48 cuts against the cutting bar 54. The movement of the circular-disk-shaped knife along the cutting bar 54 or the guide elements 53 may be effected controlled by motion links or in an electronic manner, in the known way. Preferably the cut is effected from the gripper 12 in the direction of the free edge 26 lying opposite the gripper 12, or with a folded product 14, from the fold 16 in the direction of the open end 26. In a particularly preferred embodiment, two pressing rollers running ahead of the circular-disk-shaped knife 48 on cutting are provided (not shown), which clamp and tension the respective product 14 in the region in front of the cut.

Figure 8:
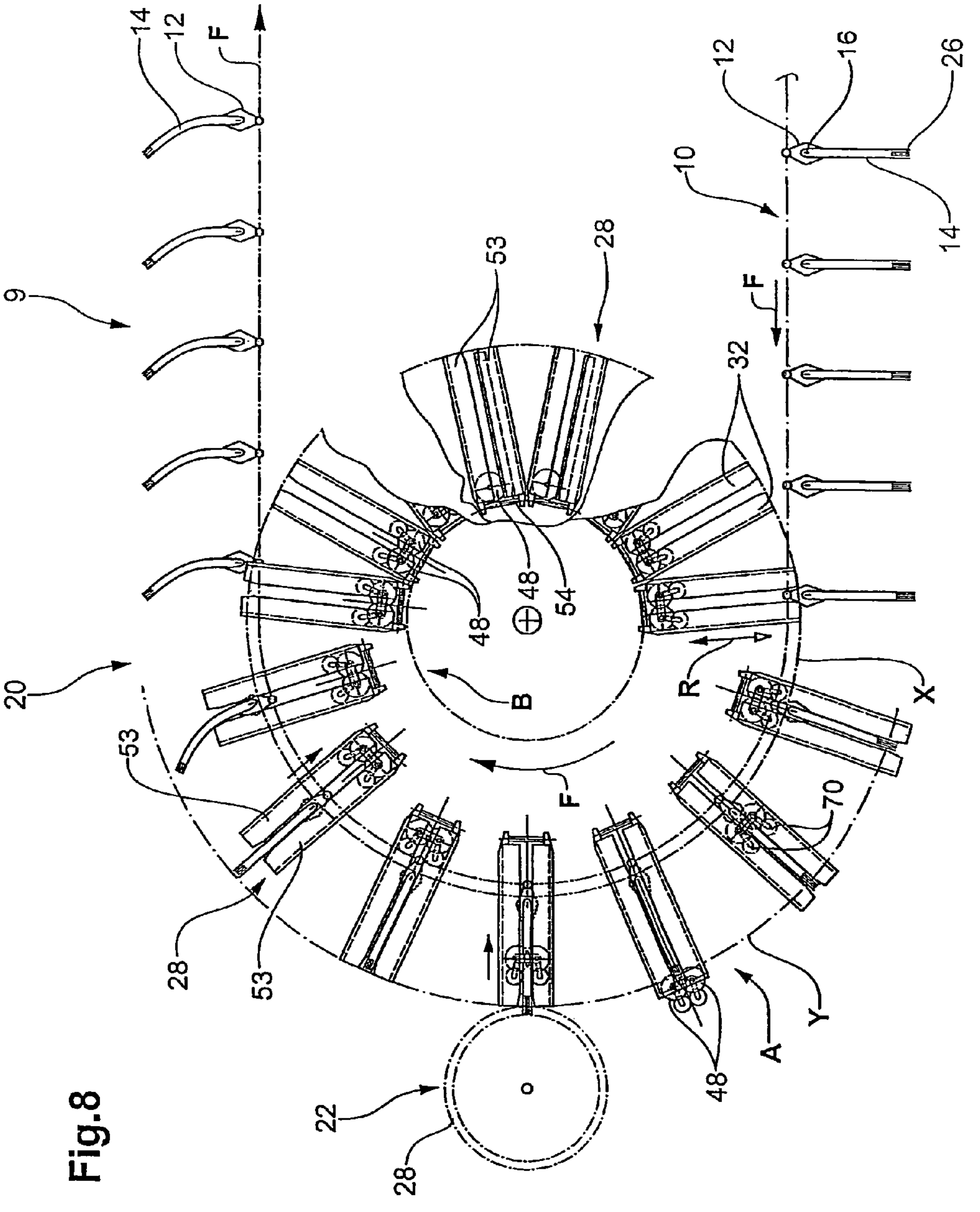
FIG. 8 illustrates a second embodiment of the device according to the invention with one variant.
Figure 10:
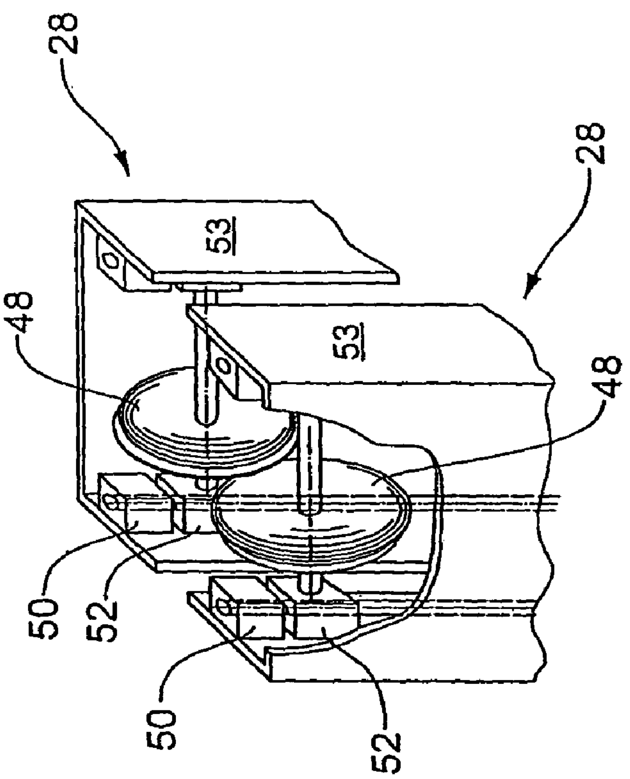
FIGS. 9 and 10 show the cutting means of the two variants of the device according to the invention from FIG. 8.
Figure 9:
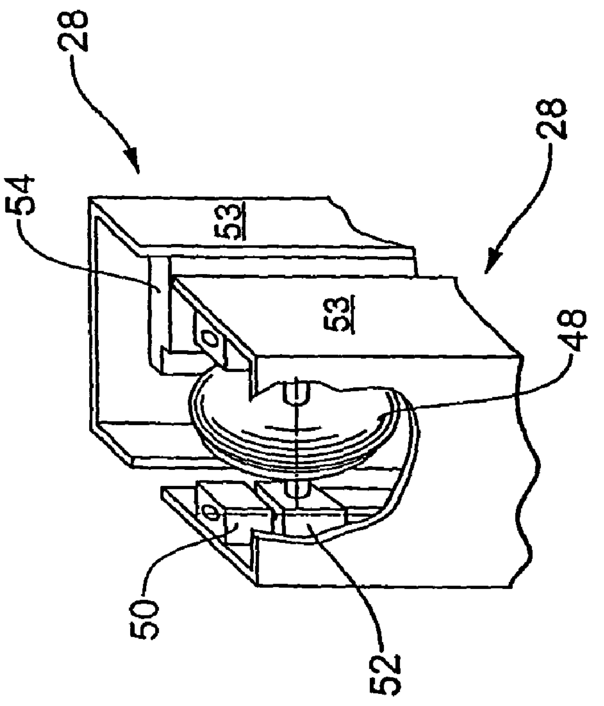

In one variant of the embodiment of the device 9 according to the invention represented in FIG. 8 on the right, cutting means 28 are provided in the cutting station 20 which instead of a circular-disk-shaped knife 48 and a cutting bar 54 (FIG. 9) comprise two circular-disk-shaped knives 48 which operate counter to one another with the shear cutting method, FIG. 10 and FIG. 8, left side. Also the two circular-disk-shaped knives 48 represented in FIG. 10 are movably mounted in guide elements 53, wherein the guide elements 53 are designed analogously to those shown in FIG. 9, and the movement pattern for the two circular-disk-shaped knives 48 may also be analogous to that of the cutting bar 54 and the knife 48. However, also other movement patterns are conceivable for both variants according to FIGS. 9 and 10, corresponding to FIG. 8 on the left and FIG. 8 on the right.

For the two circular-disk-shaped knives 48 too, the preferred direction of cut runs from the edge 16 which is not to be cut or from the fold, in the direction of the free edge 26 or the open end. Again it is advantageous to provide two pressing rollers 70 which operate counter to one another, clamp and tension the printed product 14 and which run ahead of the circular-disk-shaped knives 48 on cutting, as this is represented in FIG. 8 on the left side. After the cutting of the side edges 25 by the two circular-disk-shaped knives 48, these are again moved back to the first movement path x into the idle position B. The products 14 are simultaneously conveyed further by the grippers 12, and again are transported past the first cutting unit 22 or cutting means 28' for cutting the free edge 26. Analogously, the free edge 26 may of course be cut with cutting means 28, as are described in FIG. 9 and FIG. 8, right side. It is also conceivable to firstly cut the side edges 25 when the cutting means 28 are again moved back onto the first movement path x.

Instead of arranging the counter-knives 58' or the cutting means 28 with the circular-disk-shaped knives 48 or cutting bars 54, 56 about a rotation arbor 30, it is also conceivable to convey the cutting means 28 or only the counter-knives 58' in a conveyor direction parallel to the products 14 which are freely held and transported in the grippers, wherein the conveyor path may comprise a straight or any other configured course. The cutting means 28/counter-knives 58' conveyed parallel to the products are then moved from an idle position B on a corresponding first movement path x into a working position A on a second movement path y, in order to penetrate the product flow. With this, the first movement path x has a corresponding larger distance to the conveyor path of the products 14 than the second movement path y.

Figure 11A:
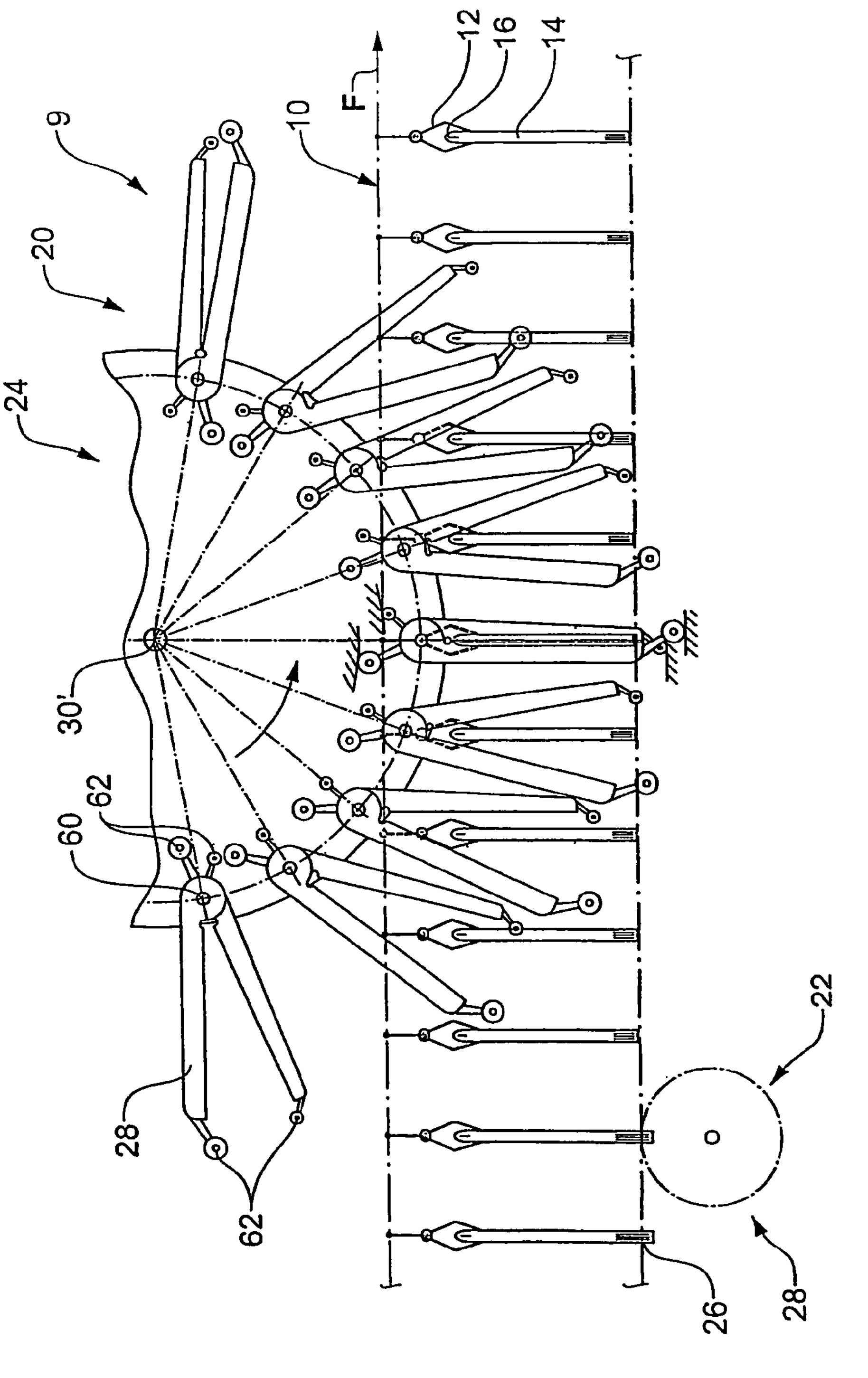
FIG. 11*a* illustrates a further embodiment of the device according to the invention.
Figure 14:
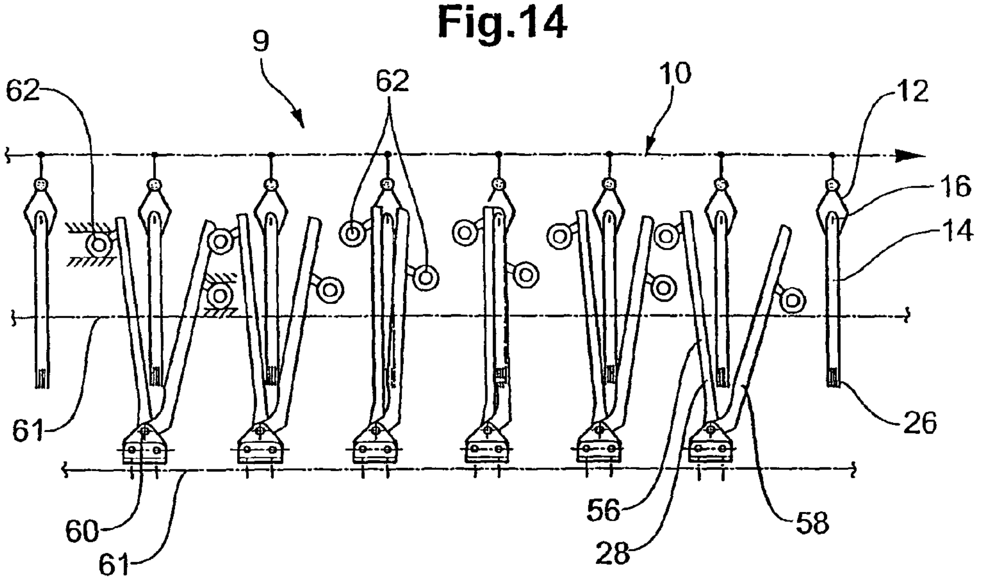
FIGS. 14 through 16 illustrate a further embodiment of the device according to the invention.

Instead of penetrating the product flow conveyed in the grippers 12 of the conveyor device 10 with the cutting means 28, it is also conceivable to lead the cutting means 28 and the products 14 together in an active region in a meshing manner, and to bring them into active connection with one another, as this is shown in FIG. 11*a*. As in the embodiments described above, here too cutting means 28 in the form of knife 58 and counter-knife 58' or knives 58 and cutting bar 56 are arranged about a rotation arbor 30' for cutting the side edges 25 of the products 14. The knives 58 and counter-knives 58' or the knives 58 and cutting bars 56 for the actual cutting procedure are pivotable counter to one another about an arbor 60 controlled by motion links, for which coupling elements 62 cooperating with the motion links (not shown) are provided (FIG. 14). Again, a first cutting unit 22 is provided in the device 9 according to the invention, for cutting the free edge 26, as will yet be described in more detail.

The penetration of the cutting means 28 into the product flow or the meshing of the products 14 with the cutting means 28 is effected with the help of a suitable control, in that the respective conveyor speeds are matched to one another and to the respective conveyor intervals, and additionally, an opening which is matched to this and a corresponding pivoting of the cutting means 28 with respect to their rotation arbor 30 is effected. The conveyor paths of the product 14 and the cutting means 28 for the meshing or engaging are preferably selected such that the conveyor paths taper at an acute angle, and after a path section running in a tangential or parallel manner, tend to move apart again. In contrast to this, e.g. the ejection of the printed products from a feeder station, i.e. from a position which as a rule is elevated (amid the diverting of the movement part of the printed product), onto or into a drum is not to be understood as meshing or engaging.

Figure 11B:
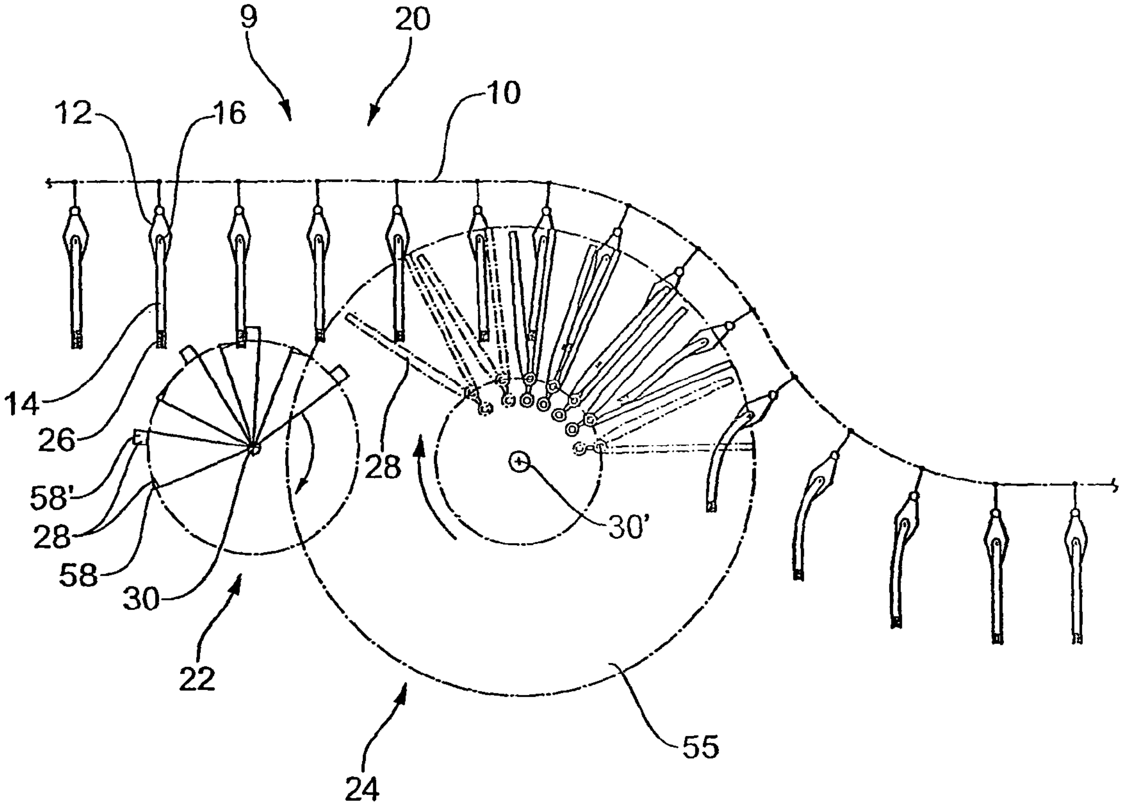
FIGS. 11*b* and 12 show yet another embodiment of the device according to the invention.
Figure 12:
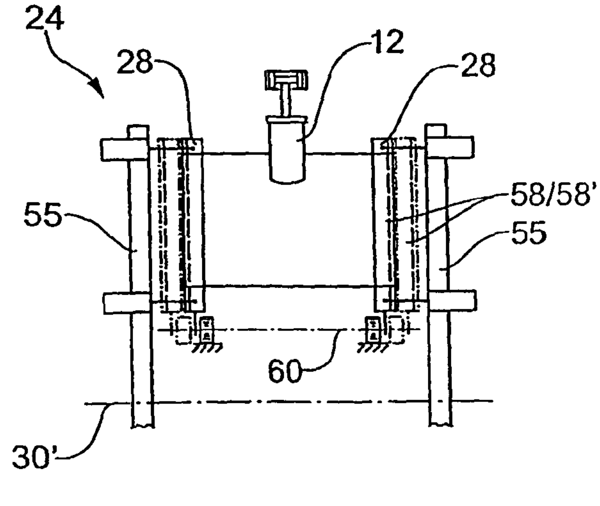

One embodiment of the device 9 according to the invention is shown in FIG. 11*b* and 12 in which the products 14 are conveyed grasped by the grippers 12 at the edge 16 which is not to be cut, and are firstly cut in the cutting unit 22 at their free edge 26. For this, in the example shown in FIG. 11*b*, the free edge 26 of the products 14 are led to the active region of the cutting means 28 of the cutting unit 22. The cutting means 28 in the cutting unit 22 are arranged rotatable about an arbor 30 at equal distances to one another, and comprise knife—counter-knife pairs 58, 58' cooperating in the shear cutting method. For cutting, the speed and the pivoting of the knife 58 and the counter-knife 58' is matched to the product being led to these, in a manner such that the counter-knife 58' is brought into supportive contact with the free edge 26 to be cut. With the cutting operation, the knife 58 then with the counter-knife 58' cuts off the free edge 26 supported in a contacting manner on the counter-knife 58'.

Figure 13:
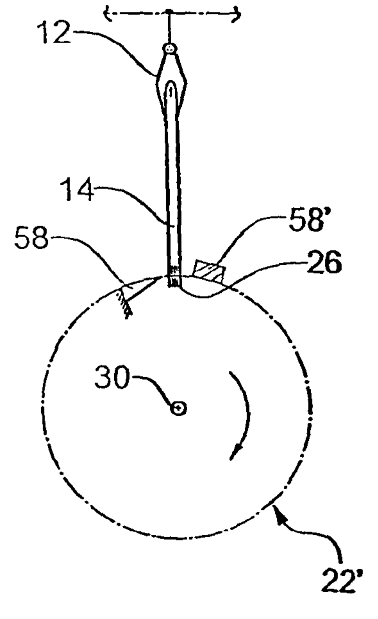
FIG. 13 illustrates the principle of a first cutting unit for cutting the free edge lying opposite the gripper.

One variant 22' of this cutting unit 22 is represented in FIG. 13, with which the knife 58 and the counter-knife 58' do not revolve together around an arbor 30, but one or more counter-knives 58' arranged at regular distances to one another rotate on a periphery about the arbor 30 (here only one counter-knife 58' is represented). This counter-knife 58' or these counter-knives 58' operate counter to a stationary knife 58, wherein the rotating counter-knife or knives 58' are led past the stationary knife 58 in a cutting engagement in a radially outward or radially inward manner (the latter is not represented). It is also conceivable, instead of the one stationary knife 58 to provide several knives 58 at regular distances to one another around the arbor 30, which likewise rotate about the arbor 30 and are led past the counter-knives 58' rotating in the same direction with a different speed, in a cutting manner, so that no fixed allocation between certain knives 58 and counter-knives 58' is given. Such a device likewise functions without a fixed allocation between certain knives 58 and counter-knives 58', when the knives 58 and counter-knives 58' revolving around the arbor 30 revolve in opposite directions about the axis.

In the second cutting unit 24 arranged downstream of the first cutting unit 22 according to FIGS. 11*a* and 11*b*, the side edges 25 are cut after the cutting of the free edge 26. For this, they may either be meshed into the knife—counter-knife pairs 58, 58' rotating about the arbor 30' (also called knife pair 28 or cutting means 28), as is also described for the device in FIG. 11*a*, or however, as is represented in the FIGS. 12 and 13, they are conveyed between two cutting means 28 arranged parallel next to one another on the arbor 30' (outer position of the knife pairs 58/58' shown dashed in FIG. 12), and the cutting means 28 are then moved on the arbor 30' so far towards the middle and the product 14 located there (inner position of the knife pairs 58/58' drawn full in FIG. 12), that the side edges 25 come to lie between the knife 58 and the counter-knife 58' of the two cutting means 28, and are cut by way of the pivoting of the knife 58 and counter-knife 58' counter to one another. Here too, the cutting means 28 are arranged rotatable about an arbor 30' at equal distances to one another, and are mounted in mounting disks 55 rotating outside of the conveyor path about the arbor 30'. The distances of the cutting elements 28 in the two cutting units 22, 24 and the respective rotation speed are matched to the transport speed and the distances of the products 14 or the grippers 12 in the conveyor device 10, so that an introduc-tion of the cutting means 28 in the manner required for cutting is possible without any problem. Of course here too, one may apply knives 58 and cutting bars 56 in an analogous manner.

Figure 15:
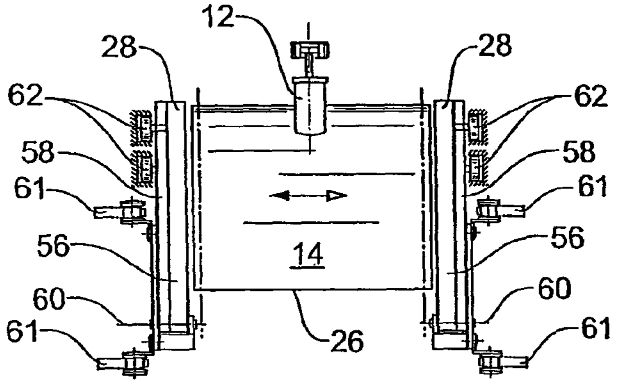
Figure 16:
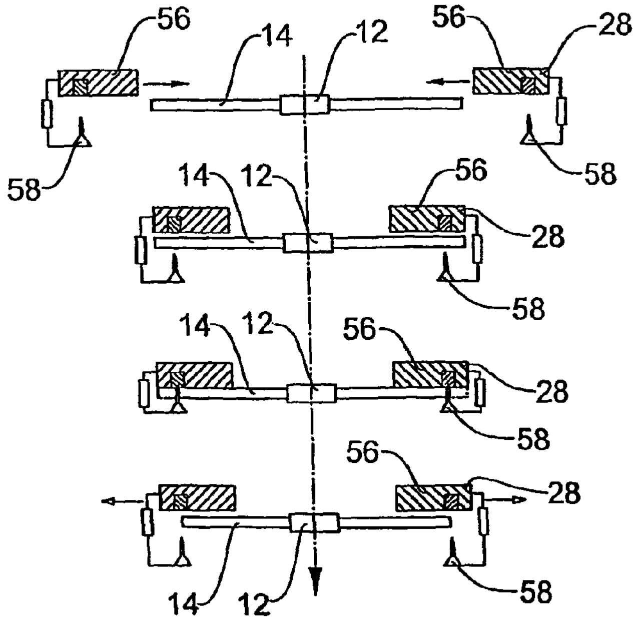

A further embodiment of the device 9 according to the invention is represented in the FIGS. 14 to 16, with which the cutting means 28 for cutting the side edges 25 are designed in the form of a knife 58 operating counter to a cutting bar 56. The knife 58 and the cutting bar 56 are pivotable counter to one another about an arbor 60. Differently to the example of FIGS. 11*b* and 12, in the embodiment shown here, the cutting means are not rotatably mounted about an axis, but are conveyed essentially parallel to the conveyor path of the products 14 or the grippers 12 by way of revolving conveyor elements 61. As is shown in FIG. 15, the cutting means 28 are conveyed on their parallel conveyor path and simultaneously are led up to the products 14 for cutting the side edges 25. The pivoting of the knife 58 and the cutting bar 56 counter to one another in this example is effected in a manner controlled by motion links, for which the knives 58 and cutting bars 56 are equipped with corresponding coupling elements 62 cooperating with the motion links. It is also conceivable to move the products 14 towards the cutting means (FIGS. 15 and 16).

Figure 17:
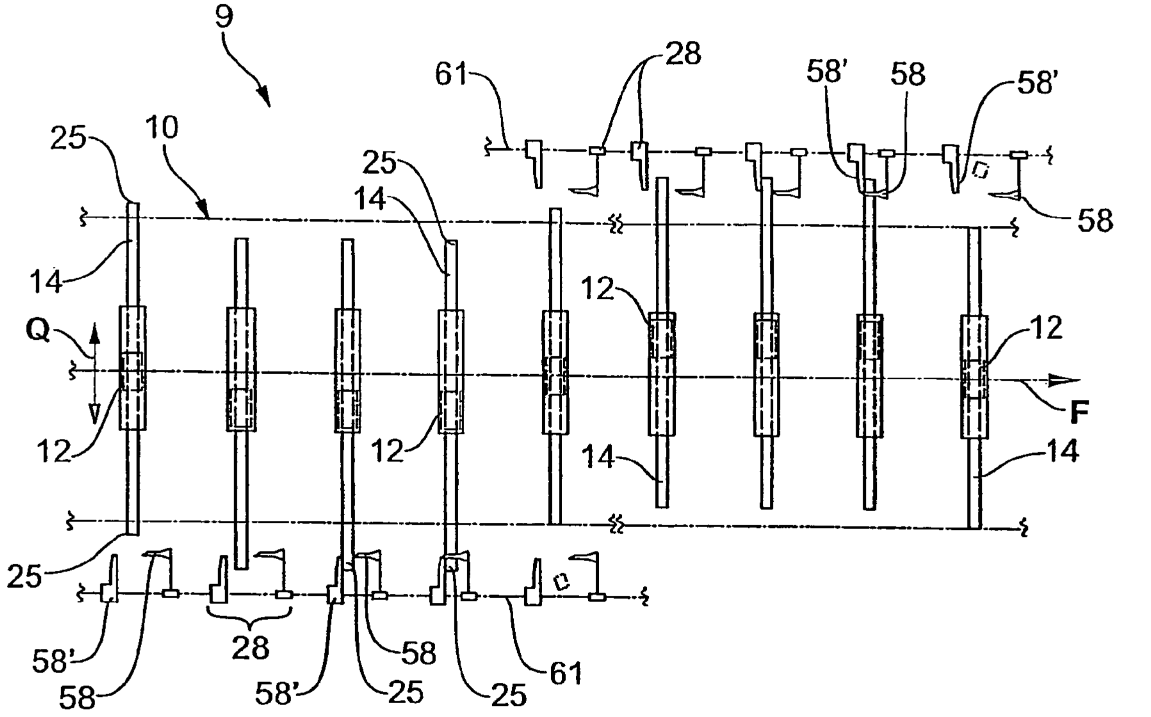
FIGS. 17 and 18 show yet another embodiment of the device according to the invention.
Figure 18:
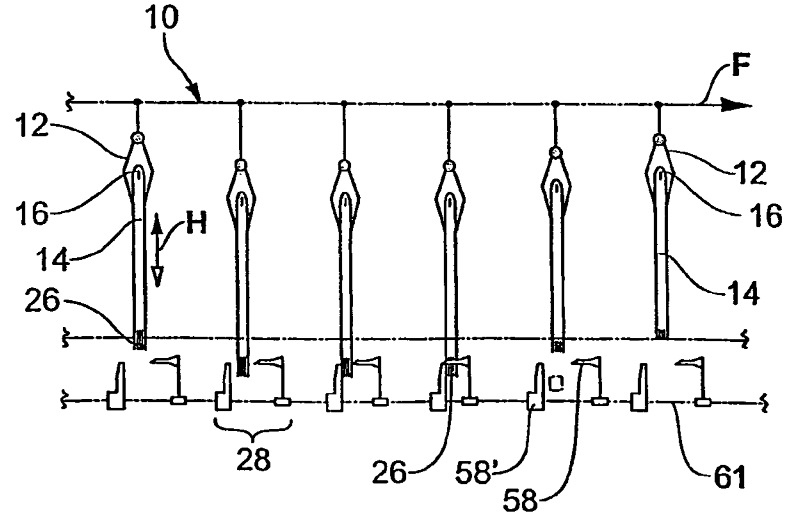

One variant of this embodiment is represented in the FIGS. 17 and 18, in which revolving cutting means 28 in a parallel manner and on both sides of the conveyor path of the grippers 12, are conveyed by way of a conveyor element 61 in a successively offset manner. The successive offset arrangement of the cutting means 28 in revolving conveyor units leads to a sequential cut of the side edges 25 of the products 14 transported hanging freely in the grippers 12. In contrast to the embodiment of FIG. 14 to 16, here it is not the cutting means 28 which are led laterally up to the products 14 to be cut, but the grippers 12 of the conveyor device 10 are displaceably mounted transversely to the conveyor direction F (arrow Q) and in the direction of the hanging products (arrow H), as is described in WO 01/81217. By way of a displacement of the grippers 12 in the trans-verse direction Q to the conveyor direction F, the products 14 in the grippers 12 firstly, for cutting the one side edge 25, are displaced into the region of the one cutting means 28 (FIG. 17, bottom left) and are cut there, and sub-sequently are moved beyond their conveyor position situated in the middle, towards the other side until there, the other side edge 25 comes into cutting engagement with the other cutting means 28 (FIG. 12, top tight) and is cut. The free edge 26 lying opposite the gripper 12 is cut in that the gripper 12 is lowered (FIG. 18, arrow H) and the edge 26 is brought into engagement with the cutting means 28 which are conveyed below the products 14 which are conveyed in a freely hanging manner parallel to the products 14 with the help of a conveyor element 61. In contrast to the cutting means of FIG. 14 to 16, here the cutting means 28 are designed as knives 58 and counter-knives 58' which operate counter to one another in the shear cutting method.

Figure 20:
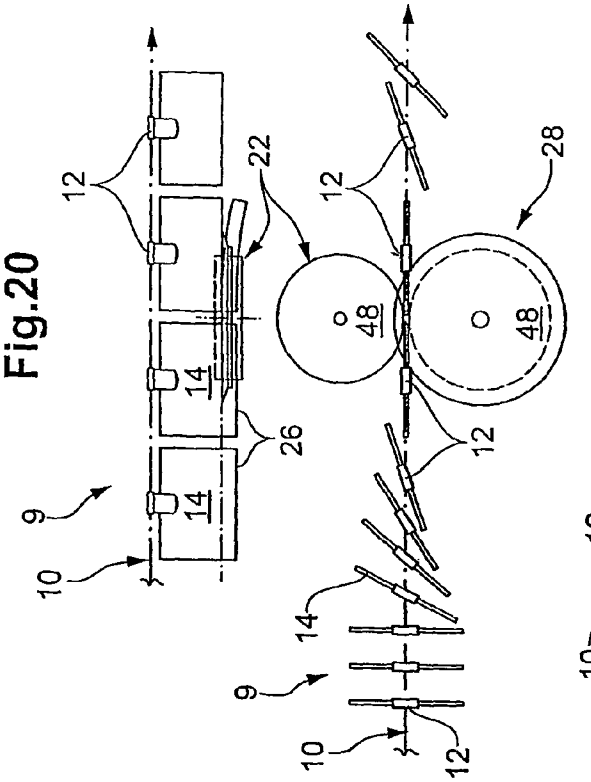
FIGS. 19 through 21 illustrate further embodiments of the device according to the invention.
Figure 19:
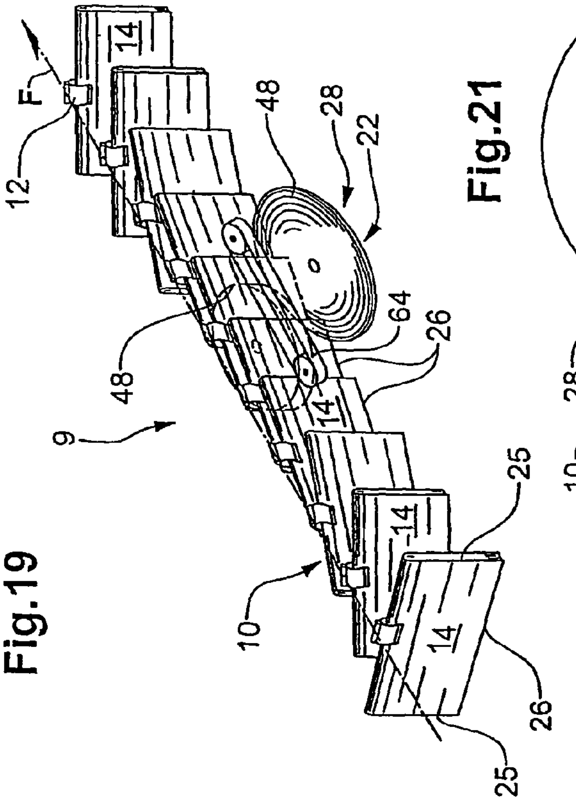

In a further embodiment, the grippers 12 may be pivoted by 90°, so that the alignment of the printed products 14 may be varied with respect to the conveyor direction F. As is represented in FIGS. 19 and 20, the grippers 12 of the conveyor device 10 are pivoted by 90° preferably in the region of the first cutting unit 22 with cutting means 28 for cutting the edge 26 lying opposite the gripper 12. Possibilities for carrying out the pivoting of the grippers 12 are for example specified in EP 854105. As is represented in FIG. 19, this leads to an arrangement of the products 14 in which they overlap one another in the conveyor direction F in the manner of an imbricate formation. The cutting of the edge 26 in this example is effected with two circular-disk-shaped knives 48 which cooperate for the cutting, in a type of shear cutting method. Instead of the two circular-disk-shaped knives 48, one may however also provide a circular-disk-shaped knife 48 which cuts into the edge of a counter roller acting as a cutting bar, as is shown in FIGS. 19 and 20 with the thick counter roller indicated behind the product flow.

An embodiment of the device 9 according to the invention, with which the grippers 12 may be conveyed at a distance to one another which is variable, so that an acceleration and braking of the grippers 12 is possible, is likewise preferred and may be combined with the pivotable grippers 12 of FIG. 19. Both embodiments and in particular also their combination increase the flexibility of application of the device 9 according to the invention, in that different processing speeds for example of working stations arranged upstream or downstream may be compensated. Furthermore, it is also possible by way of such a combination, for cutting the free edge 26, as is represented in FIG. 19, to prevent the overlapping of the products 14 by way of pivoting the grippers 12, in that the distance between the grippers 12 is increased, so that each product 14 may be individually cut, as is shown in FIG. 20. For the embodiment represented in FIG. 19 as well as for that represented in FIG. 20, it is possible in the known manner, to calm the uncontrolled movement of the two-dimensional, flexible products 14 introduced into the products 14 by the pivoting, by way of movement retarders 64 arranged on both sides of the conveyor path, in this case, belts co-running in a parallel manner.

Figure 21:
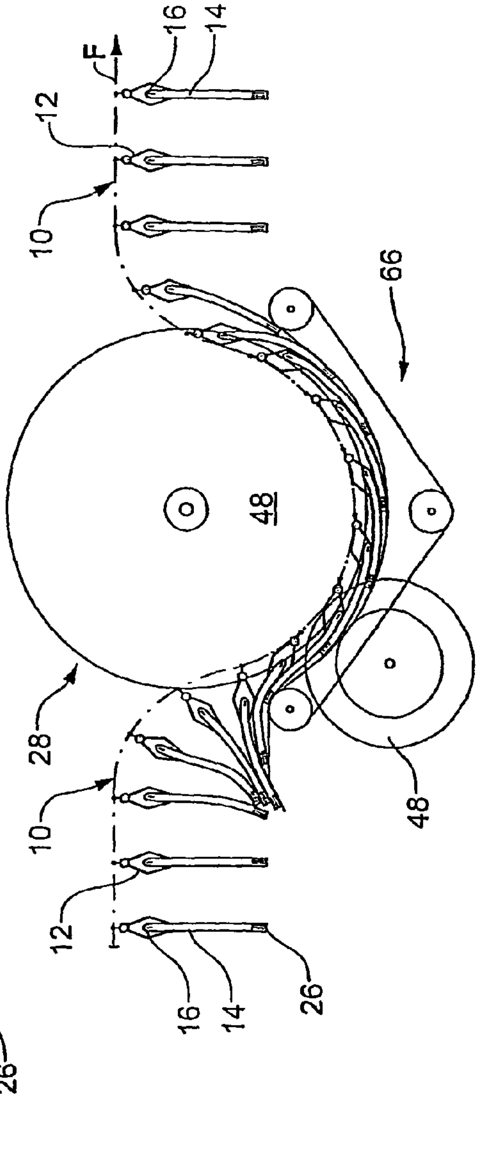

A further variant for this is shown in FIG. 21, in which the products 14 are transported in a gripped manner by the grippers 12, at the edge 16 which is not to be cut, and by way of a suitable path guidance of the conveyor path and with the help of a rest 66 which here is designed as an endless revolving belt adapted to the path guidance, are brought into an imbricate formation. Since the rest 66 is narrower than the products 14 to be cut, it is possible to cut the protruding side edges 25 of the products 14 in the thus achieved imbricate formation, in the known manner by way of two circular-disk-shaped knives 48 operating counter to one another. Disks (not shown) are incorporated next to the inwardly lying knives 48, and these disks serve as a counter support for the rest 66.

Figure 22:
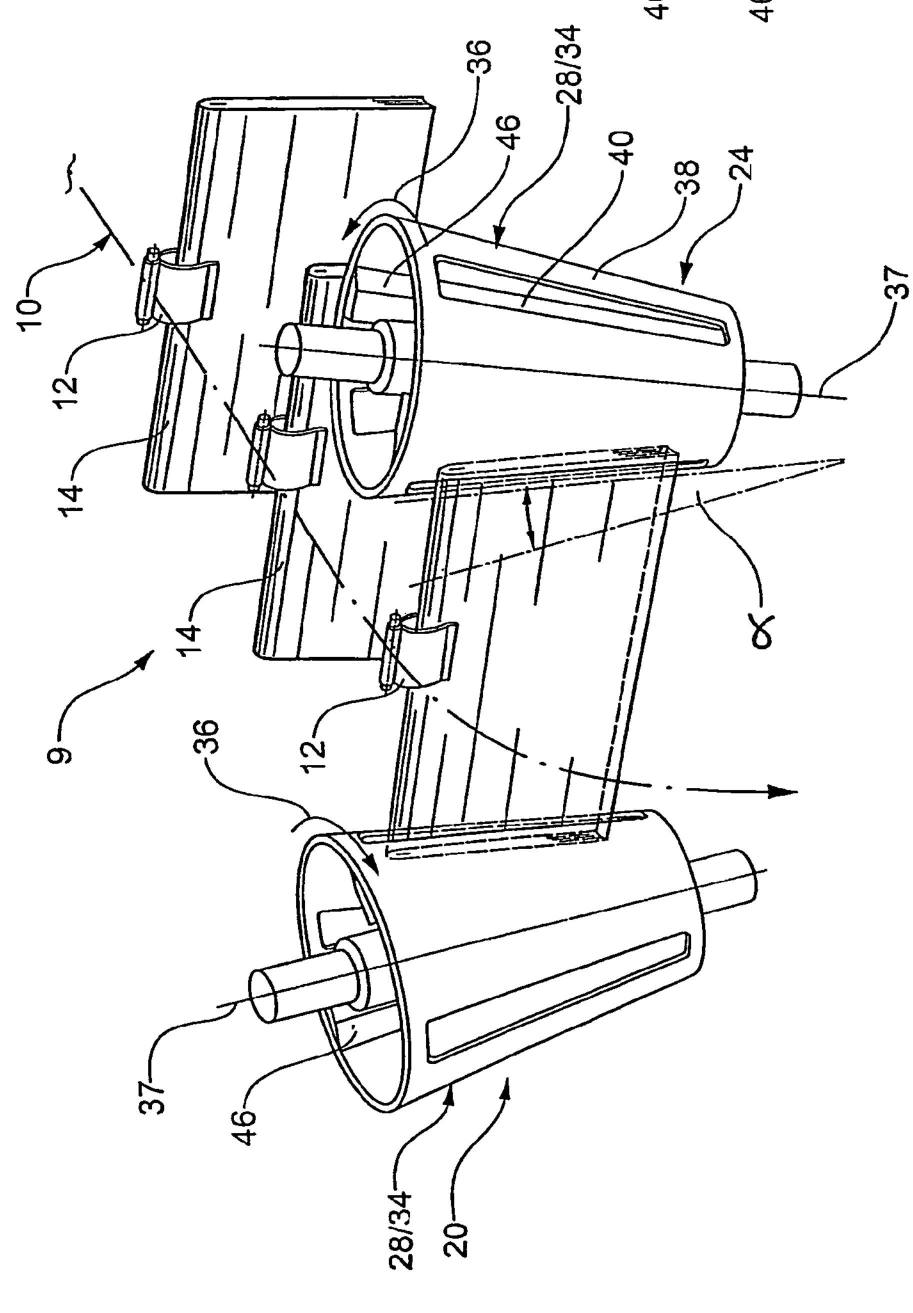
FIG. 22 shows a perspective view of, yet another embodiment of the device according to the invention.
Figure 23:
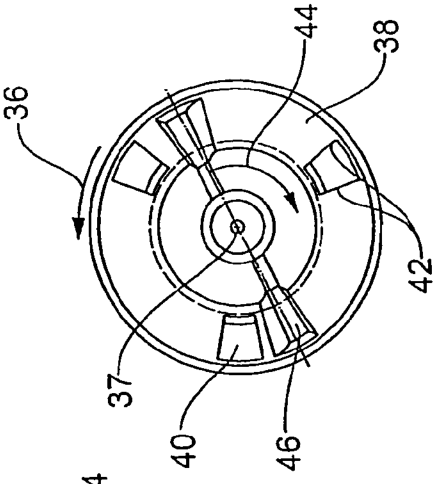
FIG. 23 illustrates a plan view of the cutting means of the embodiment of FIG. 22.

A further embodiment of the device 9 according to the invention is represented perspectively in FIGS. 22, 23. The basic construction corresponds to that of FIG. 11*b*, wherein in the example shown here in FIGS. 22, 23 one should rather speak of a meshing. Here impulse cutting devices 34 are provided in the cutting units 22, 24 (the first is not shown) for the cutting procedure.

The impulse cutting device 34 is constructed in a rotationally symmetrical manner and comprises a cage 38 with openings 40 which rotates in a first rotational direction 36 about the rotation axis 37. The openings 40 extend essentially in the longitudinal direction of the cage 38 and at their long edges 42, on the side facing the rotation axis 37, are preferably designed as knives or are provided with exchangeable knives. In a second rotational direction 44 opposite to the rotation direction 36, knives 46 extending in the longitudinal direction of the cage 38 are likewise provided within the cage 38. The rotation of the cage 38 and knives 46 is matched to the transport of the printed products 14 such that the edge 25, 26 of the product 14 to be cut meshes with an opening 40 of the cage 38 on reaching the impulse cutting device 34, and here is chopped off by way of the counter-running of the knives 46 and the long edge 42 of the cage opening 40 on account of the impulse acting on the edge 25, 26. For this, the weight of the revolving knives 46 and of the cage 38 as well as further parameters such as the design of the knife edges and the position of the knives 46 with respect to the cage opening 40, etc. are to be matched to parameters of the product to be cut, such as for example to the thickness of the printed product to be cut 14, to the type of paper, to the humidity and to the quality of the paper etc., in order to obtain the required inertia and the required cutting properties for an impulse cut. The position of the knives 46 to the long edges 42 of the openings 40 may be parallel or slightly oblique, so that a product to be cut between the knife 46 and the long edge 42 of the openings, is either cut off on the complete length simultaneously by the impulse (parallel position) or however in a continuous manner beginning at one end of the opening 40 up to the other end of the opening 40. The oblique position may not be selected too large, so that the acting impulse does not become too small. The course of the conveyor means 10 is spatially aligned such that an optimal matching to the cutting units 22, 24 is achieved.

For a second cutting unit 24, for cutting the free edge 26 lying opposite the gripper, the cage 38 is designed in the manner of a cylinder periphery (not shown), and the knives 46 rotating in opposite direction within the cylinder periphery are accordingly arranged on a cylinder periphery with a somewhat smaller radius. For cutting a side edges 25 of a product 14 conveyed on an approximately circular path by the cutting means, the cage 38 is preferably designed in the shape of a truncated cone, as this is represented in the FIGS. 23, 24. The knives 46 run on a corresponding, somewhat smaller cone periphery than the cage 38. The angle of inclination a of the cone surface with respect to the rotation axis 37 at the same time is selected such that the speed difference from the radial outer edge to the radial inner edge of a product 14 which is led past the cutting units 24 on an approximately circular path is compensated. Thereby, the impulse cutting device 34 is arranged such that the cone surface is aligned radially to the circular path axis of the conveyor path of the products 14.

Further variants are conceivable regarding the embodiments presented here. Thus for example one may always cut the edge lying opposite the gripper, in that the method according to the invention is applied in a repeated manner until the desired sides are cut. With this, the product in the gripper is changed in its position in the gripper, e.g. by way of gripping over or transfer to another gripper, such that the edge to be cut is arranged opposite the gripper. This variant entails a design expense, but may for example be realized with a device as is disclosed in EP 854105.

Instead of the embodiment of the cutting means 28 cited here, it is also possible to cut the products by ultrasound, as is described e.g. in CH 690296, or with a moved knife, as is known from DE 19638307. A cutting method as is defined in EP 0367715 in the first claim may also be applied, in order to cut products gripped at their fold transported in the gripper 12.

All Figures serve for illustration. The device according to the invention is not limited to the variants shown in the Figures. The man skilled in the art knows which features of the described devices and methods he may combine in a meaningful manner. It is also clear that, and how, the device 9 and the method may be varied with or without additional knowledge of the field, without departing from the inventive concept.

Although the cutting units 22, 24 with their cutting edges 28, described above, have only been described in cooperation with products 14 conveyed in a freely held manner in grippers 12, most of these cutting means however certainly in a manner which is slightly adapted with regard to design are also suitable for cooperation with differently configured conveyor means such as pocket transporters and saddle transporters or saddle drums or cell (compartment) wheels or likewise. This in particular applies also for the cutting means represented in the FIGS. 4 to 10 and 22, 23.

What is claimed is:

1. A device for transporting flexible products, comprising:

a conveyor device with a plurality of spaced-apart grippers deployed to travel along a conveyor path, in which a portion of a single edge of individual ones of the flexible products are grasped and conveyed in a freely hanging manner by corresponding ones of said grippers exerting a compression force on the portion of the single edge of corresponding ones of the flexible products in which the single edge is not to be cut in at least regions on the conveyor path, the portion of the single edge of the flexible products being in a center of the single edge of the flexible products and being less than one half of an entire length of the single edge of the flexible products; and a cutting station arranged in the conveyor path of the conveyor device having a device disposed to cut the product, the grippers holding the freely hanging flexible product such that, with the active connection of the cutting device with the product, at least one edge of the flexible product is cut;

the freely hanging flexible products being suspended by the grippers in a manner in which three of four edges of the flexible product and an area between the three of the four edges of the product including a space of the flexible product between three of the four edges of the flexible product are not being held or constrained by any device, mechanism or element, except where grasped by the grippers, and the cutting device cuts the at least one edge of the flexible product while the flexible product is being conveyed by the conveyor device, the space including an entire center region of the flexible product and an entire area between two of the four edges of the flexible product;

corresponding ones of the grippers releasing individual ones of the freely hanging flexible products being held by the grippers to move due to a force of gravity upon release of the compression force; and the grippers maintaining the compression force on the flexible products during the cutting of the flexible products.

2. A device according to claim 1, wherein the cutting device is guided on an endless circulation and is moveable from an idle position on a first movement path into a working position on a second movement path between the products conveyed on the conveyor path.

3. A device according to claim 1, wherein the cutting device comprises two circular-disk-shaped knives which operate counter to one another in a shear cutting method, or a circular-disk-shaped knife and a cutting bar or counter roller which operate counter to one another in the knife cutting method.

4. A device according to the claim 1, wherein the cutting device comprises a circular-disk-shaped knife and a cutting bar movably mounted in a guide element of the cutting device, and wherein a pressing roller which runs ahead on cutting is allocated in particular to the circular-disk-shaped knife and to the cutting bar and counter roller.

5. A device according to claim 1, wherein the cutting device comprises a knife and a cutting bar which are pivotable counter to one another via an axis, in a manner such that the knife operates against the cutting bar for cutting.

6. A device according to claim 1, wherein the cutting device comprises a knife and a counter-knife which are pivotably connected counter to one another via an axis.

7. A device according to claim 1, wherein the cutting device comprises an impulse cutting device is disposed to make said cut of the at least one edge.

8. A device according to claim 1, wherein the cutting device comprises an impulse cutting device comprised of a first unit with edges rotating about a central rotation axis, said edges being provided as knives, and a second unit with knives rotating concentrically about the central rotation axis in an opposite direction to the first unit, wherein the knives and the edges have a mass and are moveable past one another by rotation with a cutting interaction, such that a product located between the knife and the edge is cut off during the impulse acting on the edge.

9. A device according to claim 8, wherein the first rotating unit is a cage formed with a cylindrical periphery, and having openings with edges which cooperate with the knives rotating in opposite directions within the cylindrical periphery.

10. A device according to claim 8, wherein the first rotating unit comprises a cage having a shape of a truncated cone, wherein the angle of inclination of a periphery of the cone with respect to the rotation axis is selected to compensate for a speed difference of a product led on an approximately circular path by the cutting units at the radial outer edge to the radial inner edge.

11. The device according to claim 1, wherein the grippers in the conveyor device are conveyed in a pivotable manner.

12. The device according to claim 1, wherein the grippers in the conveyor device are conveyed in a manner displaceable transversely to said conveyor.

13. The device according to claim 1, wherein the grippers in the conveyor device are conveyed in a manner in which distances between the grippers are variable.

14. The device according to claim 1, wherein said flexible products are printed products.

* * * * *